(12) United States Patent
Li et al.

(10) Patent No.: US 8,761,248 B2
(45) Date of Patent: Jun. 24, 2014

(54) METHOD AND SYSTEM FOR INTELLIGENT VIDEO ADAPTATION

(75) Inventors: Zhu Li, Palatine, IL (US); Faisal Ishtiaq, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 1545 days.

(21) Appl. No.: 11/744,100

(22) Filed: May 3, 2007

(65) Prior Publication Data

US 2008/0123741 A1    May 29, 2008

Related U.S. Application Data

(60) Provisional application No. 60/867,453, filed on Nov. 28, 2006.

(51) Int. Cl.
*H04N 7/12* (2006.01)
*H04B 1/66* (2006.01)

(52) U.S. Cl.
USPC ............. 375/240.04; 375/240.26; 382/232; 382/236; 382/239

(58) Field of Classification Search
USPC ......... 375/240.04, 240.26; 382/232, 236, 239
See application file for complete search history.

(56) References Cited

U.S. PATENT DOCUMENTS

| | | | |
|---|---|---|---|
| 5,583,951 A * | 12/1996 | Sirat et al. | 382/232 |
| 5,983,251 A * | 11/1999 | Martens et al. | 708/203 |
| 6,574,279 B1 | 6/2003 | Vetro et al. | |
| 6,664,913 B1 * | 12/2003 | Craven et al. | 341/200 |
| 6,810,086 B1 | 10/2004 | Puri et al. | |
| 6,937,770 B1 * | 8/2005 | Oguz et al. | 382/235 |
| 7,194,128 B1 * | 3/2007 | Payton | 382/166 |
| 7,209,519 B2 * | 4/2007 | Vetro et al. | 375/240.03 |
| 7,881,370 B2 * | 2/2011 | Reichel et al. | 375/240.03 |
| 2003/0099298 A1 | 5/2003 | Rose et al. | |
| 2004/0028131 A1 * | 2/2004 | Ye et al. | 375/240.11 |
| 2004/0125877 A1 | 7/2004 | Chang et al. | |

(Continued)

FOREIGN PATENT DOCUMENTS

EP    1529401 B1    5/2006

OTHER PUBLICATIONS

Kobla, V. et al. "Developing High-Level Representations of Video Clips Using Video Trails" Proceedings of the SPIE, SPIE, Bellingham VA, vol. 3312, Jan. 1, 1998, pp. 81-92, XP000878718 ISSN: 0277-786X.*

(Continued)

*Primary Examiner* — Beemnet Dada
*Assistant Examiner* — Thomas Gyorfi
(74) *Attorney, Agent, or Firm* — Pablo Meles; Sylvia Chen

(57) ABSTRACT

A system (100) and method (200) for efficient video adaptation of an input video (102) is provided. The method can include segmenting (210) the input video into a plurality of video shots (142) using a video trace (111) to exploit a temporal structure of the input video, selecting (220) a subset of frames (144) for the video shots that minimizes a distortion of adapted video (152) using the video trace, and selecting transcoding parameters (122) for the subset of frames to produce an optimal video quality of the adapted video under constraints of frame rate, bit rate, and viewing time constraint. The video trace is a compact representation for temporal and spatial distortions for frames in the input video. A spatio-temporal rate-distortion model (320) provides selection of the transcoding parameters during adaptation.

21 Claims, 13 Drawing Sheets

(56) References Cited

U.S. PATENT DOCUMENTS

2005/0058197 A1   3/2005   Lu et al.
2006/0188014 A1   8/2006   Civanlar et al.
2006/0238445 A1*  10/2006  Wang et al. .................... 345/55

OTHER PUBLICATIONS

Kobla, V. et al. "Representing and Visualizing Structure in Video Sequences" Proceedings of ACM Multimeida 97, Seattle WA, Nov. 9-13, 1997; [Proceedings ACM Multimedia], Reading, Addison-Wesley, US, vol. Conf. 5, Nov. 9, 1997, pp. 335-346, XP000765791 ISBN: 978-0-201-32232-3.*

Han K J et al. "Eigen-image based video segmentation and Indexing" Proceedings of the International Conference on Image Processing, Santa Barbara CA, Oct. 26-29, 1997, pp. 538-541, XP010254002 ISBN: 978-0-8186-8183-7.*

Ariki Y: "Scene Cut Detection and Article Extraction in News Video Based on Clustering of DCT Features" Systems and Computers in Japan, Wiley, Hoboken NJ, vol. 29, No. 7, Jun. 30, 1998, pp. 50-56, XP000782039, ISSN: 0882-1666.*

Wikipedia article for "Principal component analysis" published Nov. 18, 2006 (8 pages) http://en.wikipedia.org/w/index.php?title=Principal_component_analysis&oldid=88689000.*

Patent Cooperation Treaty, "PCT Search Report and Written Opinion of the International Searching Authority" for International Application No. PCT/US2007/084737 dated May 20, 2008, 14 pages.

Shih-Fu Chang, "Optimal Video Adaptation and Skimming Using a Utility Framework", XP002361311, http://citeseer.ist.psu.edu/535549.html, retrieved on Dec. 27, 2005, 8 pages.

Luis Herranz et al., "An Engine for Content-Aware On-Line Video Adaptation", XP019051408, Semantic Multimedia Lecture Notes in Computer Science, 2006, pp. 101-112, Springer-Verlag Berlin Heidelberg.

Shih-Fu Chang and Anthony Vetro, "Video Adaptation: Concepts, Technologies, and Open Issues", XP011123860, Proceedings of the IEEE, Jan. 2005, pp. 148-58, vol. 93 No. 1.

Yong Wang et al., "Content-Based Utility Function Prediction for Real-Time MPEG-4 Video Transcoding", XP010669820, Proceedings of Int'l Conf. on Image Processing, Sep. 14-17, 2003, pp. 189-192.

* cited by examiner

To segment Input Video      210

```
┌─────────────────────────────────────────┐
│ Generate a video trace from the input   │
│ video, wherein the input video          │
│ comprises a sequence of frames and the  │── 212
│ video trace is a compact representation │
│ for temporal and spatial distortions of │
│ a sequence of the frames                │
└─────────────────────────────────────────┘
                    ↓
┌─────────────────────────────────────────┐
│ Segment the input video into video      │
│ shots based on the video trace, wherein │── 214
│ a video shot comprises a set of frames  │
│ having continuity                       │
└─────────────────────────────────────────┘
```

FIG. 7

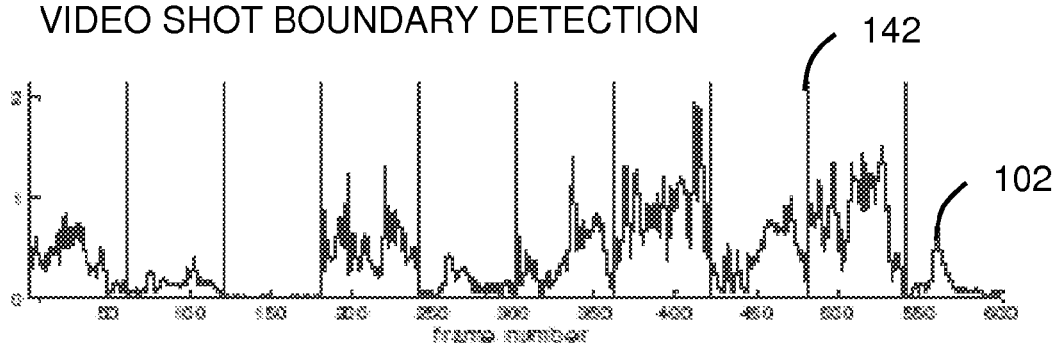

FIG. 8

VECTORIZE AN IMAGE OF A FRAME

BASIS FUNCTIONS

VIDEO TRACE

VIDEO TRACE PROJECTION

```
% thresholds search                      ─ 510         500
FUNCTION [D_avg, D_max, S]=GetSummary(r)
    Sum=0; Dx=0;
    FOR k=2:n
        Sum = Sum +d(f_k, f_{k-1});
        IF d(f_k, f_{k-1}) > Dx      ─ 512
            Dx = d(f_k, f_{k-1});
        END
    END
    % Sum = sum of differential distortion
    % Dx = max differential distortion
    % heuristic choices on W_1, W_2 and e.
    %  e.g. e=0.1, W_1=2.0, W_2=0.45.
    T_max = (W_1*Sum/n + W_2*Dx);
    m = fix(r*n);
    WHILE (1)                            ─ 514
        T1=Dx; T2=n*T_max; T_min = (T1+T2)/2;   ─ 516
        [D_avg, D_max, S]=ComputeSummary(T_max, T_min);
        IF |S| = m OR T2-T1 < e;           % stop criterion
            RETURN;
        ELSE IF |S| > m
            T1 = T_min;
        ELSE
            T2 = T_min;
        END
    END % compute summary for given thresholds   ─ 518
FUNCTION [D_avg, D_max, S]=ComputeSummary(T_max, T_min)
% initially, summary S consists of the 1st frame.
L = 1; S={f_1}; m=1;
DSum=0;
FOR k=2:n
    DSum = DSum +d(f_k, f_{k-1});
    IF d(f_k, f_L) > T_max OR DSum > T_min
        S=S+{f_k};
        m=m+1;           ─ 520
    END
END
```

FIG. 15

METHOD AND SYSTEM FOR INTELLIGENT VIDEO ADAPTATION

CROSS REFERENCE TO RELATED APPLICATIONS

This application claims the benefit of U.S. Provisional Patent Application No. 60/867,453, filed Nov. 28, 2006, the entire contents of which are incorporated by reference herein.

FIELD OF THE INVENTION

The present invention relates to video processing, and more particularly, to video transcoding and adaptation.

INTRODUCTION

The use of portable electronic devices and mobile communication devices has increased dramatically in recent years. The demand for video enabled mobile devices is rapidly increasing. Video processing requires a significant amount of signal processing which places high demands on a mobile device having limited computational power and battery life. Video is generally received as input in a compressed format to reduce the amount of data required to represent the video images. The compressed data also facilitates real time data delivery due to the reduced amount of data to be transmitted. However, in some cases, a mobile device can receive video content that cannot be reliably played due to mobile device constraints such as data rate. Also, a user is generally required to watch the video at a video play rate with a video quality associated with the play rate. Mobile devices can implement video coding techniques or scaling operations that allow the mobile device to access to certain video coding parameters. The mobile device can adjust the video coding parameters to change the video, though with limitations. Moreover, video coding techniques do not address how a compressed video sequence can be optimally adapted to a new compressed bit stream with a different set of encoding parameters.

SUMMARY

Broadly stated, embodiments of the invention are directed to a method for providing intelligent video adaptation. Video adaptation is a different technique than video coding. In video adaptation, the input video is already compressed once in a given format. An input video that is compressed can provide side information to help understand the underlying video sequence to be adapted. The information provided in the side information can reside at the signal level, object level, and potentially even at the syntactical level. The compression can also provide information as to the rate-distortion behavior of the input video sequence.

One embodiment includes a method for efficient video adaptation of an input video. The method can include segmenting the input video into a plurality of video shots using a video trace to exploit a temporal structure of the input video, selecting a subset of frames for the video shots that minimizes a distortion of adapted video using the video trace, and selecting transcoding parameters for the subset of frames to produce an optimal video quality of the adapted video under constraints of frame rate, bit rate, and viewing time constraint. The method can further include the steps of querying spatio-temporal distortion models for quantization parameters at various operating points, and adapting the transcoding parameters to network characteristics, device capacity, and user preference in accordance with the spatio-temporal distortion models.

The adaptation can be a process of selecting an operating point that satisfies the user preferences, and meets system constraints while providing optimal video quality in the adapted video. In one arrangement, the video trace and the spatio-temporal distortion models can be pre-computed and saved as side information with the input video. Alternatively, the video trace and the spatio-temporal distortion models can be built directly from the input video during adaptation. Parameters such as shot length, bit-rate, frame rate, resolution, and viewing time are addressed during a minimization of spatial and temporal distortion in the resulting adapted video.

Generating a video trace can include performing principal component analysis on images in the input video. Principal component analysis can include reconstructing an image from a frame of the input video, scaling the image to accommodate for a display width and height, vectorizing the image to produce a vectorized image, and projecting the vectorized image on a set of basis functions. The video trace is a compact representation for temporal and spatial distortions for frames in the input video. The quality of adapted video can be determined by evaluating distances in the video trace. The distances in the video trace correspond to temporal distortions between frames which are used for selecting frames and their associated transcoding parameters.

Video adaptation can include selecting frames and their transcoding parameters to achieve optimal video quality. A spatio-temporal rate-distortion model provides a selection of the transcoding parameters during adaptation. In one arrangement, a view time constraint can be received for adjusting a video play speed. A data rate that is desired for encoding the video shots at the video play speed can be determined and a P-SNR curve in the spatio-temporal rate-distortion model can be selected that matches the view time constraint. Quantization parameters for operating conditions and the view time constraint can be identified in the P-SNR curve that achieves the desired data rate.

Another embodiment of the invention is directed to a method for generating side information to an input video. The method can include generating a video trace from the input video, segmenting the input video into a plurality of video shots using the video trace, identifying transcoding parameters for the plurality of video shots for various constraints of viewing time and bit rate, and evaluating operating points on video shots as a function of viewing time and bit rate for the transcoding parameters. The spatio-temporal rate-distortion models and the video trace can be stored as side information with the input video. Building spatio-temporal rate-distortion can include evaluating several operating points on plurality of video shots and interpolating between the operating points for identifying quantization parameters.

Yet another embodiment of the invention is a system for transcoding an input video. The system can include a compressed domain processor for receiving an input video and generating a video trace from the input video. The system can include a video adaptation engine (VAE) operatively coupled to the compressed domain processor for using the video trace to temporally segment an input video into video shots, select which frames to transcode in the video shots, and generate transcoding parameters for the frames that provide optimal adapted video quality. The transcoding can be adapted in accordance with an adaptation request and operating points of a transcoder. The system can further include a shot segmentation unit that receives the video trace from the compressed domain processor and segments the input video into video shots having rate-distortion coding consistency across frames, and a transcoder that receives the video shots from the shot segmentation unit and receives transcoding parameters from the VAE for adapting the input video to produce adapted video in accordance with constraints of bit rate, frame rate, and distortion.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

FIG. 7 is a method for segmenting video using a video trace in accordance with the embodiments of the invention;

FIG. 8 is an illustration of video shot boundaries in accordance with the embodiments of the invention;

FIG. 15 is a portion of pseudo code for selecting frames in accordance with the embodiments of the invention;

DETAILED DESCRIPTION

Figure 1:
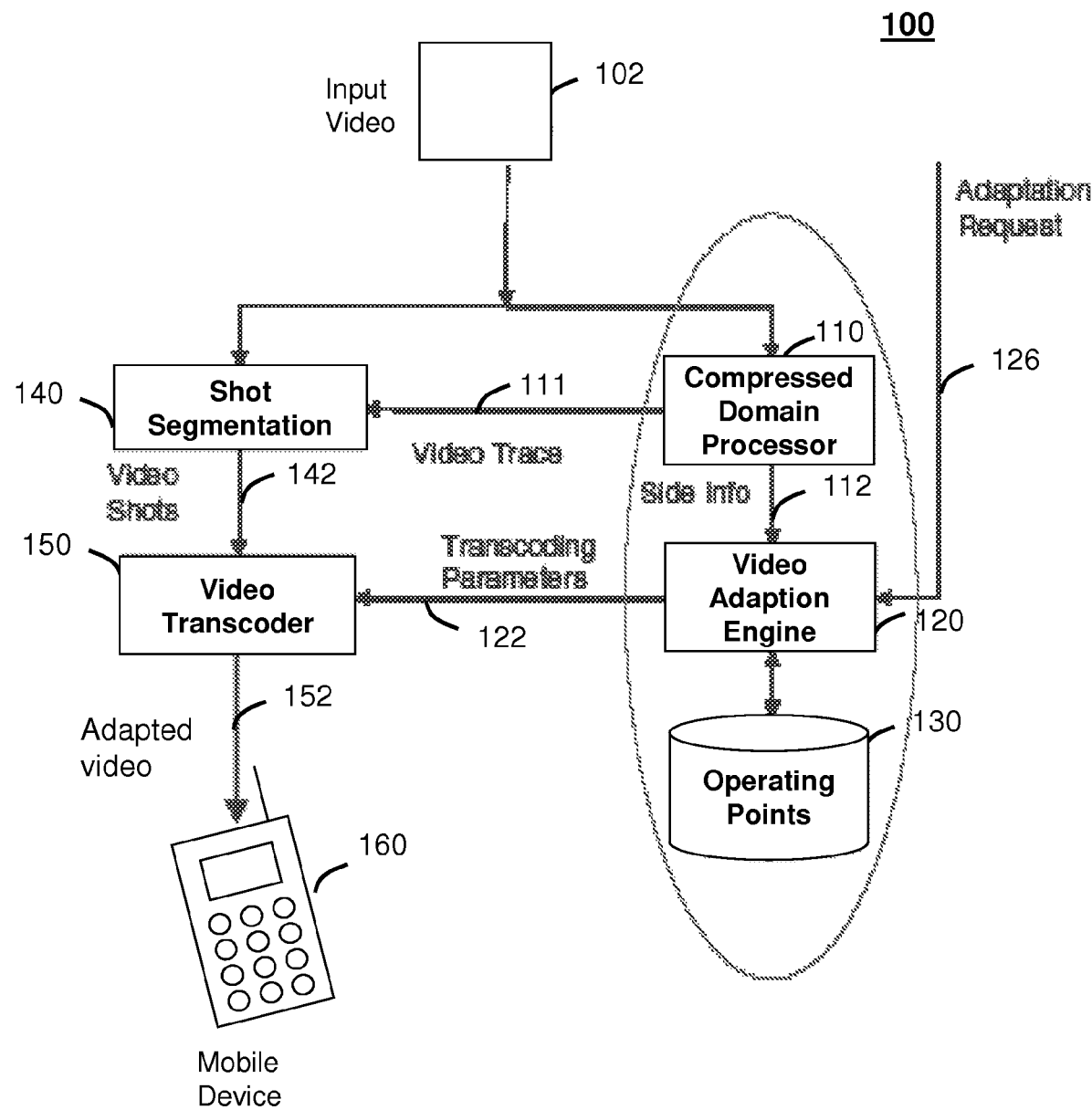
FIG. 1 is a video adaptation system for transcoding input video in accordance with the embodiments of the invention.

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Briefly, the method for intelligent video adaptation can include dividing an input video into a sequence of video shots using a video trace, and querying a spatio-temporal rate-distortion model to choose the transcoding parameters for each video shot. Operating points can be evaluated in the spatio-temporal distortion models, and transcoding parameters can be selected to achieve an optimal quality of adapted video for user preferences and system constraints. The spatio-temporal model and the video trace can both be pre-computed and stored as side information with the input video.

FIG. 1 shows a video adaptation system 100 for video transcoding. The video adaptation system 100 may be implemented in software by a processor such as a microprocessor or a digital signal processor (DSP) as is known in the art, or any other suitable electronic device. The functions of the video adaptation system 100 may also be implemented in hardware such as an ASIC or FPGA as is known in the art, or any other suitable hardware. Broadly stated, the video adaptation system 100 can receive an input video 102 and render the input video 102 into a form that is more amenable for use in a constrained devices, such as a mobile device 160. For example, the mobile device 160 may be a memory constrained or processing constrained device that alone does not produce acceptable video quality for the input video 102. The video adaptation system 100 can be included within the mobile device 160 to transcode the input video 102 into a format and produce an adapted video 152 that provides optimal video quality for given operating points 130 of the mobile device 160 and any adaptation requests 126 by the user. For example, the user may adjust a video playback speed of the input video which requires the video adaptation system 100 to account for the video playback speed. In such regard, the video adaptation system 100 can transcode the input video 102 to provide high quality video while supporting different viewing times.

As shown, the video adaptation system 100 can include a compressed domain processor 110 for processing the input video 102 and creating a video trace 111 from the input video 102. The compressed domain processor 110 can also store the video trace 111 as side information 112. In another arrangement, the video trace 111 can be pre-computed and stored as side information 112. The side information 112 can also include pre-computed spatio-temporal rate-distortion models for providing optimal video quality at a given operating point 130. The video adaptation system 100 can also include a video adaptation engine (VAE) 120 operatively coupled to the compressed domain processor 110 for generating transcoding coefficients 122, a shot segmentation unit for segmenting the input video 102 into video shots 142, and a video transcoder 150 for adapting the input video 102 from the video shots 142 and the transcoding parameters 122 in a format that provides optimal video quality on the mobile device 160.

Briefly, the shot segmentation unit 140 receives the video trace 111 from the compressed domain processor 110 and segments the input video 102 into video shots 142 using the video trace 111. The video trace 111 is a compact representation for temporal and spatial distortions for frames in the input video 102. The VAE 120 determines which frames in the video shots 142 produce a lowest temporal and spatial distortion given the video trace 111 and operating points 130. The VAE 120 selects those frames producing the lowest distortion given the operating points 130 and the adaptation request 126. An operating point 130 is associated with the transcoder 150 and specifies operating parameters such as video output display size, temporal compression level, and quantization parameters. Upon selecting the frames in the video shots, the VAE 120 then generates the transcoding parameters 112 for those frames that provide optimal adapted video quality in accordance with the adaptation request 126 and operating points 130. The video transcoder 150 receives the video shots 142 from the shot segmentation unit 140 and the transcoding parameters 122 from the VAE 120 for adapting the input video 102 to produce the adapted video 152 in accordance with constraints of bit rate, frame rate, and adapted video distortion associated with the mobile device 160.

Broadly stated, the VAE 120 makes intelligent transcoding decisions in order to best transcode the input video 102 in an efficient manner that produces an optimal quality of adapted video 152 given the adaptation request 126 and operating points 130. The VAE 120 selects transcoding parameters 122 during an adaptation session. The adaptation session consists of selecting frames within video shots 142 for producing an adapted video 152 having low video distortion, and selecting the transcoding parameters for the selected frames to yield an optimal video quality. It should be noted that the VAE 120 adapts the selection of the frames and the transcoding parameters 122 for the frames over multiple video shots. This adaptation is performed to satisfy traditional constraints such as bit rate, frame rate, and overall adapted video quality distortion. Moreover, the VAE 120 can accommodate the adaptation request 126 to adjust the video transcoding such that a desired output viewing time can be achieved. This allows a user to specify a video play rate which the user can change during video play. The resulting adapted video 152 provides good visual quality at low bit rates.

Figure 2:
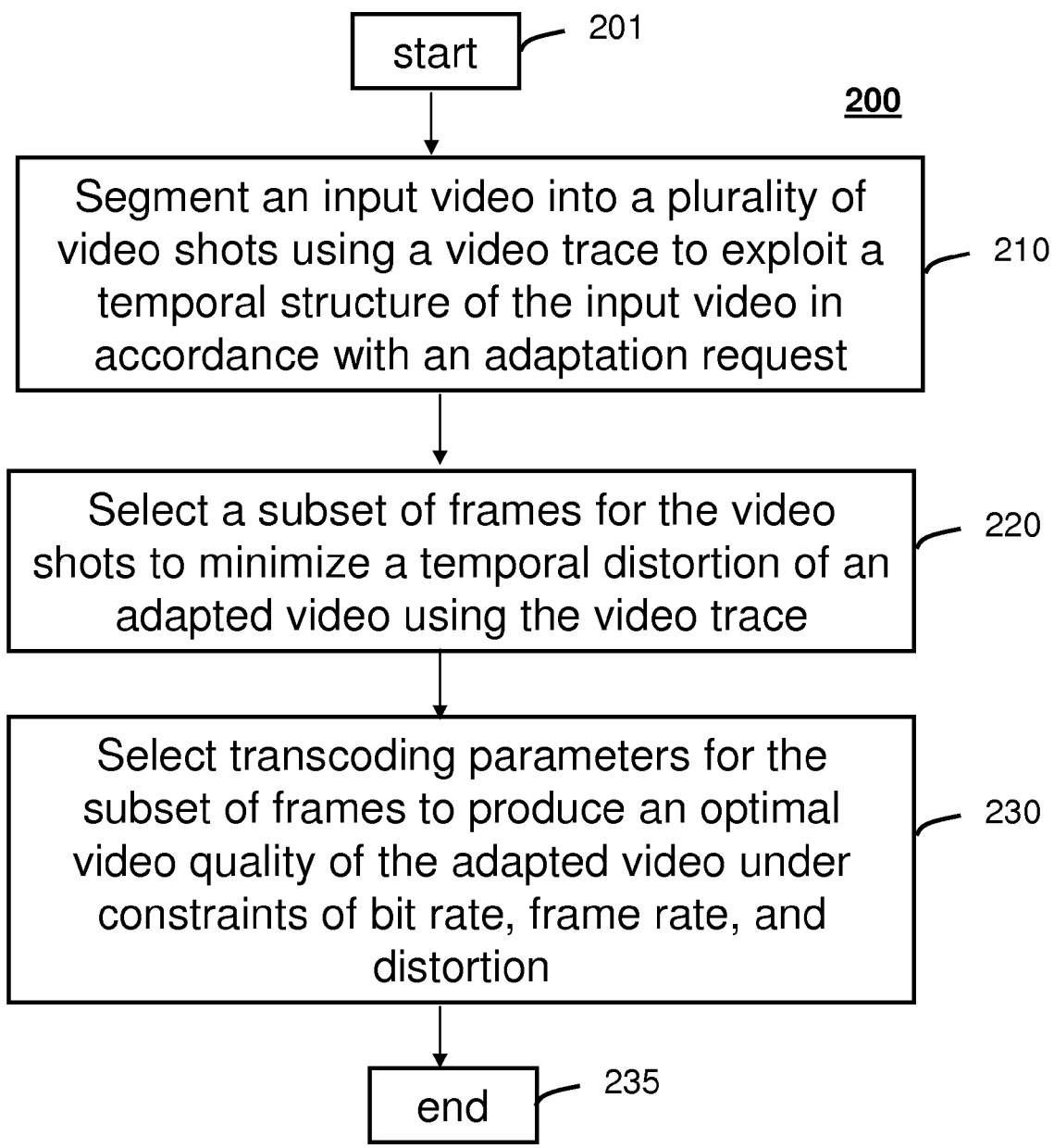
FIG. 2 is a method for intelligent video adaptation in accordance with the embodiments of the invention.

Referring to FIG. 2, a method 200 for intelligent video adaptation is shown. The method 200 can be practiced with more or less that than the number of steps shown. To describe the method 200, reference will be made to FIGS. 1 and 3 although it is understood that the method 200 can be implemented in any other suitable device or system using other suitable components. Moreover, the method 200 is not limited to the order in which the steps are listed in the method 200. In addition, the method 200 can contain a greater or a fewer number of steps than those shown in FIG. 2.

The method 200 can start at step 201 in a state wherein an input video has been received for transcoding. For example, on a mobile device 160, the method 200 can start when a user makes a request to download video content or stream video data. In response to the request, an input video can be provided to the mobile device. An input video is a video that has already been compressed. At step 210, the input video can be segmented into a plurality of video shots using a video trace to exploit a temporal structure of the input video. For example, referring to FIG. 3, the shot segmentation unit 140 can partition the input video 102 into one or more video shots 142. A video shot 142 can be a sequence of frames 143, wherein each frame 143 includes image data for rendering a portion of a video. The video shots allows a transcoding of a large video piece to operate more efficiently. The image data can be in the form of pixels representing a range of red green or blue color depth. The step of segmenting the input video 102 into video shots 142 exploits the underlying temporal structure of the sequence of frames 143 in the input video 102 to improve adaptation performance.

The shot segmentation unit 140 partitions the frames 143 into video shots 142 based on content. In particular, the input video is segmented into multiple video shots 142 of visually consistent video frame segments. The video shots 142 consist of frames having smooth coding, or rate-distortion, behavior upon transcoding. That is, frames within a video shots 142 are chosen to provide rate-distortion coding consistency. Scene cuts, fade-in, fade-outs, occlusion, and fast motion are all behaviors that negatively affect the smoothness and accuracy of the coding models for the video shots. Accordingly, the input video 102 is segmented at these locations to avoid abrupt transitions during transcoding. The video shots 142 then serve as the basic units upon which transcoding parameters will be adapted and which will allow for smooth and accurate modeling of the rate-distortion behavior of the video shot undergoing adaptation. That is, the video shots 142 serve as adaptation units to the video adaptation engine 120 for selecting frames within the video shots and their associated transcoding parameters as seen in FIG. 1.

At step 220, a subset of frames for the video shots can be selected to minimize an adapted video distortion using the video trace 111. Briefly, the video trace 111 is a compact representation of temporal and spatial distortion measures for frames 143 in the input video 102. Using the video trace 111, a distortion between frames 143 can be determined by measuring a distance in the video trace 111. Notably, the video trace 111 provides a compact representation for distortion measures between frames 143 in the input video 102. In such regard, the video trace 111 can be pre-computed and stored as side information to an input video 102 that can be later referred to for video adaptation. For example, the video trace 111 can be provided as side information 112 with the input video 102 (See FIG. 1). Accordingly, any video adaptation system can use the video trace 111 for shot boundary detection or any other purpose such as building spatio-temporal rate-distortion models.

Figure 3:
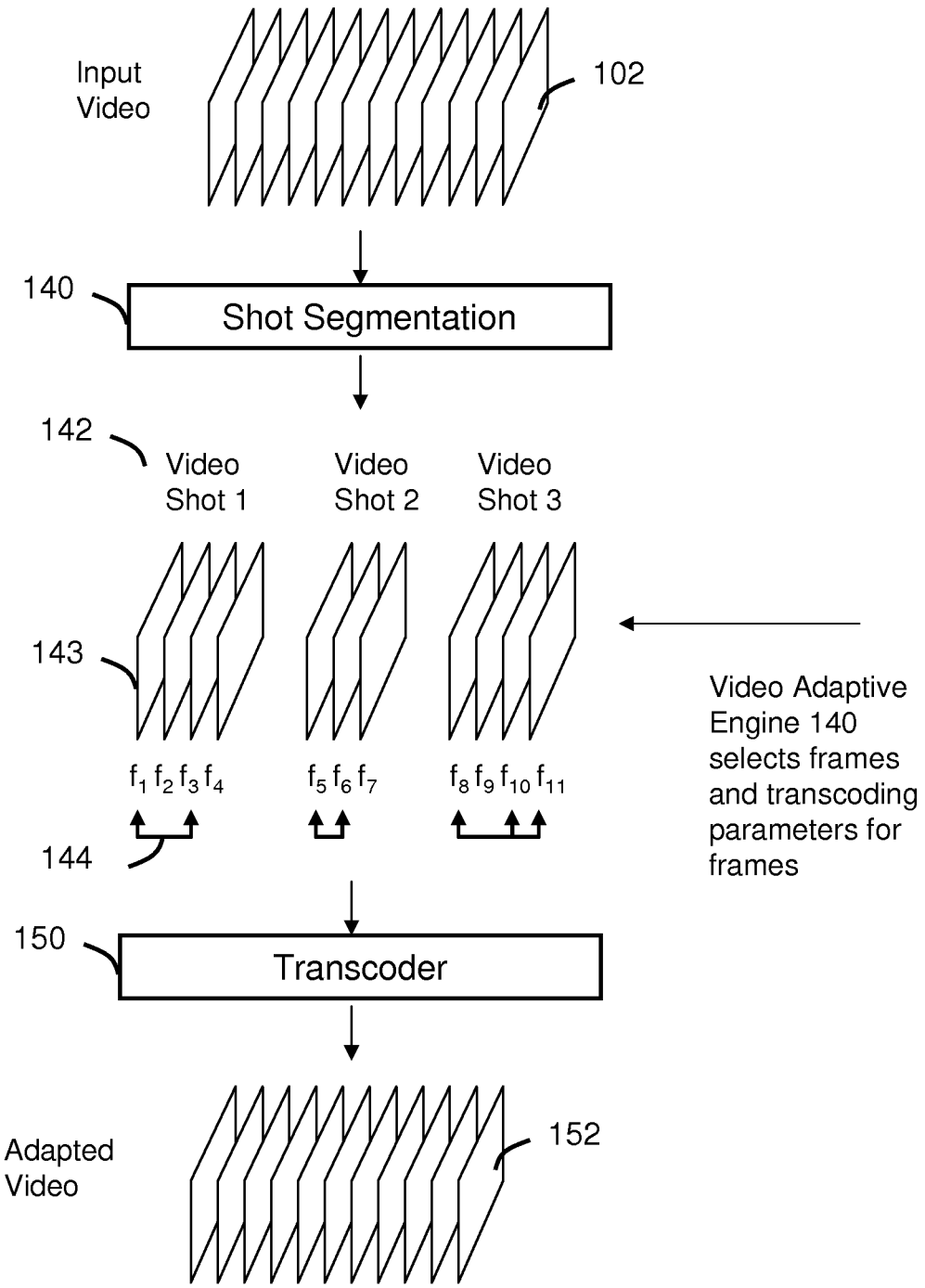
FIG. 3 is an illustration for segmenting an input video into video shots in accordance with the embodiments of the invention.

Referring to the example of FIG. 3, each video shot 142 can consist of a number of frames 143. A subset 144 of the frames 143 in each video shot 142 can be chosen to minimize an adapted video distortion in view of the video trace 111. In practice the VAE 120 selects the frames based on distortions between frames measured in the video trace 111. Notably, the quality of the adapted video 152 depends on the selected subset of frames 144 and the chosen transcoding parameters for the subset of frames 144. For example, referring back to FIG. 1, the VAE 120 can select a subset of frames 144 based on the adaptation request 126 and the operating points 130 that produce a minimum distortion. In one arrangement, the adaptation request 126 can be a viewing time constraint that establishes a video playback speed of the adapted video. The operating points 130 can include a bit-rate, r, and a time compression rate, $r=m/n$, both associated with the mobile device 160, where n is the number of frames of the input video 102, and m is the number of frames of the adapted video 152. Notably, the transcoder produces the adapted video 152 in accordance with the operating points 130 of the mobile device. The operating points 130 can be parameters associated with the transcoder 150 such as bit rate, R, quantization parameters QP, and video output frame width, W, and height, H.

At step 230, transcoding parameters can be selected for the subset of frames to produce an optimal video quality of the adapted video under operating point constraints. Operating point constraints include bit rate, frame rate, and distortion and which determine the resulting video quality of the adapted video 152. It should be noted that the operating points are a subset of the transcoding parameters that are instantiated by the transcoder. For example, referring to FIG. 1, the VAE 120 selects transcoding parameters for frames selected in the video shots 142. The transcoder 150 then produces the adapted video 152 using the frames and transcoding parameters selected by the VAE 220. Recall at step 220, the VAE selected the frames that resulted in the lowest video distortion for the adapted signal for a given operating condition. The VAE 120 effectively evaluates the adapted video distortion for different operating conditions, and identifies the frames that achieve the lowest distortion for a particular operating condition. The VAE 120 also selects the transcoding parameters that yield the lowest distortion for the selected frames based on the video trace 111. The selection of the transcoding parameters 122 also depends on spatio-temporal distortion models. In practice, the VAE 120 refers to spatio-temporal distortion models to determine which frames in a video shot, and which transcoding parameters for the selected frames results in the highest quality adapted video; i.e., lowest video distortion. The spatio-temporal distortion models can be pre-computed and made available as side information 112 to the VAE 112. Alternatively, the VAE 220 can build the spatio-temporal distortion models for immediate use during video adaptation.

Figure 4:
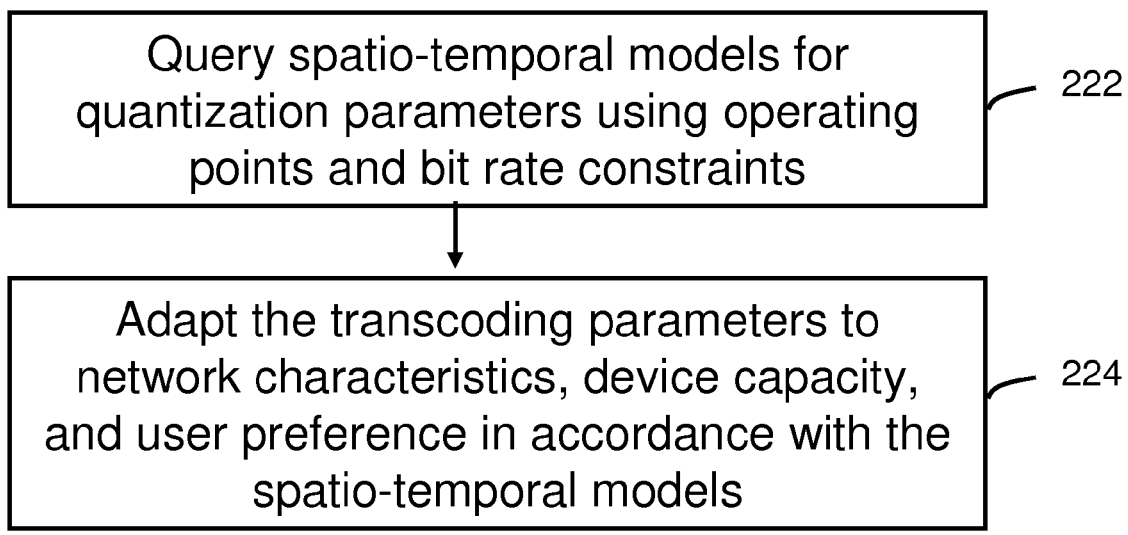
FIG. 4 is a continuation of the method for intelligent video adaptation in FIG. 2 in accordance with the embodiments of the invention.
Figure 5:
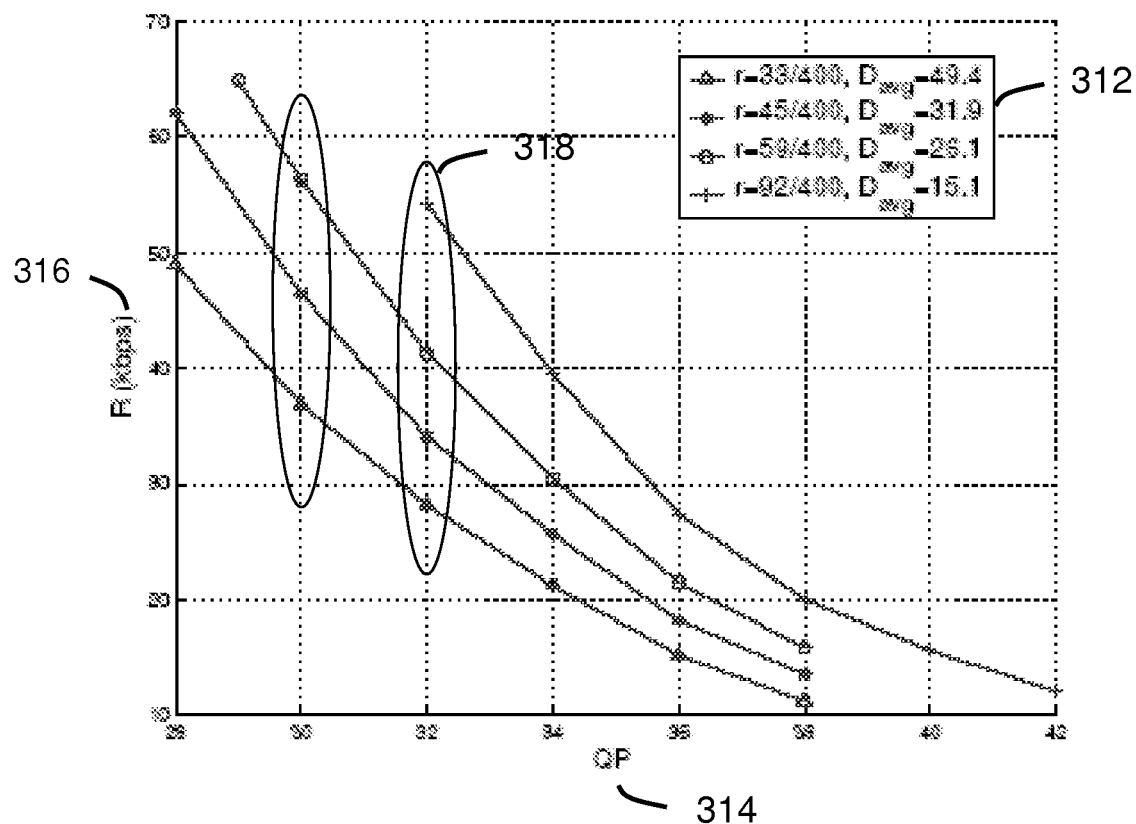
FIG. 5 is a R(QP,r) spatio-temporal rate model in accordance with the embodiments of the invention.

For example, briefly referring to FIG. 4, at step 222 a spatio-temporal model can be queried to determine quantization parameters, given an operating point and a bit rate. The spatio-temporal model provides associations between bit-rate, quantization parameters, time compression ratios, and video quality. Referring to FIG. 5, a R(QP,r) spatio-temporal rate model 310 is shown. The spatio-temporal rate model 310 specifies a family of curves 312 associated with a time compression ratio, r, 312. Each curve 312 has an associated quantization parameter, QP 314, and an associated bit rate, R 316.

The spatio-temporal rate model, R(QP,r), 310 specifies the bit-rate, R 316, as a function of a quantization parameter, QP 314, and a compression ratio, r 312. The spatio-temporal rate model, R(QP,r), 310 can be queried during adaptation. For example, given a time compression ratio, r 312, and a bit-rate, R 316, a quantization parameter QP 314 can be determined from the spatio temporal model 310. Referring back to FIG. 1, the VAE 120 upon determining the bit rate, R 316, supported by the transcoder 150 and the time compression ratio, r 312, provided in the adaptation request 126, queries the R(QP,r) spatio-temporal rate model 310 for quantization parameters, QP 314. In one arrangement, the quantization parameters, QP 314, are an integral number 318 representing the number of bits used for encoding a frame 143 of input video 102. For example, a video frame 143 may require 32 bits for encoding. Notably, increasing or decreasing the number of bits (i.e. QP 314) can change the adapted video quality depending on the operating points and the bit rate, R. In practice, to determining the number of quantization parameters, QP 314, the VAE 120 can look up the quantization parameter QP 314 from the R(QP,r) spatio-temporal rate model 310 given the bit rate, R 316, and the time compression ratio, r 312. The R(QP,r) spatio-temporal rate model 310 may also be pre-computed and stored as side information to the input video. A method for generating the R(QP,r) spatio-temporal rate model 310 is provided ahead.

At step 224, the transcoding parameters can be adapted to network characteristics, device capacity, and user preference in accordance with the spatio-temporal distortion models. For example, referring to FIG. 3, the VAE 120 may select a first group of frames 143 in video shot 1, select the transcoding parameters for the first group of frames 143, and evaluate the quality of the adapted video 152 of the transcoding using the spatio-temporal models. It should also be noted, that the adapted video does not need to be evaluated for quality. That is the adapted video 152 does not need to be reconstructed. The quality of the adapted video 152 can be determined directly from the video trace 111 and the spatio-temporal rate-distortion models based on the subset of frames 143. In particular, the video trace 111 inherently includes measures of distortion between frames, and the patio-temporal rate-distortion models identify the configuration parameters to employ to achieve a video quality. In order to address video quality associated with frames in the video shots, the VAE 120 also queries another spatio-temporal rate model.

Figure 6:
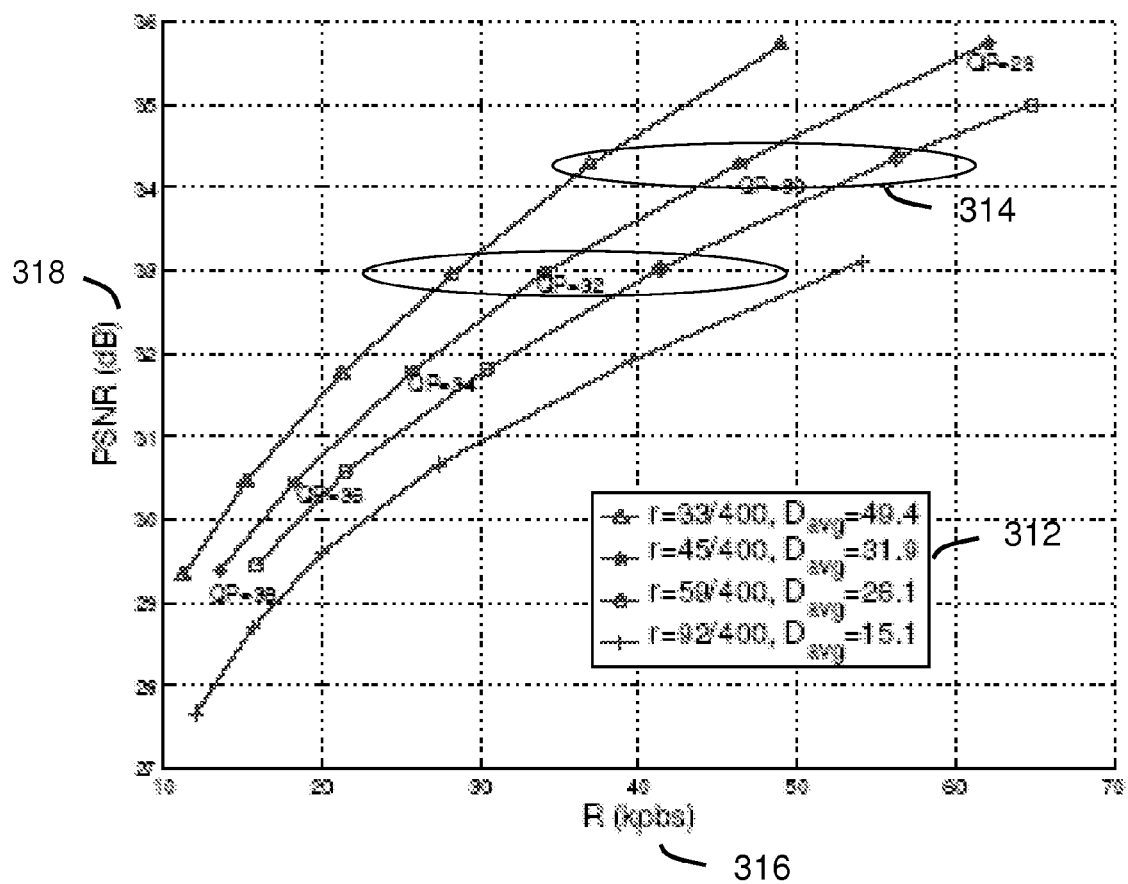
FIG. 6 is a PSNR-R spatio-temporal rate model in accordance with the embodiments of the invention.

Referring to FIG. 6, a Peak Signal-to-Noise Ration (PSNR-R) spatio-temporal rate-distortion model 320 is shown. The PSNR-R spatio-temporal rate-distortion model 320 shown is actually a slice of a three-dimensional spatio-temporal rate distortion model with a fixed viewing time constraint. The PSNR-R value 318 reveals the video signal quality given a set of operating condition. The operating conditions are provided directly from the R(QP,r) spatio-temporal rate model 310: bit rate, R 316, time compression ratio, r 312, and quantization parameters QP 314. As shown, the PSNR-R spatio-temporal rate-distortion model 320 includes a fixed viewing time constraint. That is, FIG. 6, shows a PSNR-R spatio-temporal rate-distortion model for one viewing time constraint. Different time constraints result in a different family of curves. Recall in FIG. 1, that the adaptation request 126 can include a viewing time constraint which identifies the user's preferred playback speed for video. Accordingly, the video adaptation system 100 can account for the viewing time constraint by including it in the spatio-temporal rate-distortion model 320.

To show the rate-distortion tradeoffs, the R-PSNR curves are combined for different view time compression ratios r, as seen in FIG. 6. The top line is the R-PSNR curve for the temporal compression ratio r=33/400, with resulting $D_{min}$=49.4. Curves for other temporal compression levels r={45/400, 59/4000, 92/400} are similarly plotted. For each R-PSNR curve, QPs 314 are known at certain control points for the spline interpolation. Example for r=45/400 is shown in the FIG. 6. More operating points can be provided through interpolation techniques to achieve more accuracy in the R-D mode, which comes at the price of computation and storage.

Referring back to FIGS. 1 and 3, the VAE 120 determines the optimal subset of frames 144 and transcoding parameters 122 for the subset of frames 144 in video shots based on the operating constraints 130 and the viewing time constraint. Briefly, the PSNR-R spatio-temporal rate-distortion model 320 of FIG. 6 specifies the video signal quality associated with certain operating points. That is, the PSNR value 318 reveals the quality associated with a transcoding of a video frame using quantization parameters QP 328, with a bit-rate R 314, for a given time compression ratio 312. In this embodiment, it is not necessary to reconstruct the adapted video from the transcoding parameters to determine the video quality. That is, the PSNR values 318 in the PSNR-R spatio-temporal rate-distortion model 320 already identify the video quality of the adapted video.

The PSNR values 318 can be directly determined by examining the number of quantization parameters QP used. As an example, the number of zero valued quantization parameters are known to be associated with a specific PSNR value. Accordingly, determining the PSNR values 318 from the R(QP,r) spatio-temporal rate-distortion model 310 involves counting the number of zero valued quantization parameters 314. Again, the PSNR-R spatio-temporal rate-distortion model 320 can be pre-computed and stored as side information prior to performing video adaptation. That is, the PSNR-R spatio-temporal rate-distortion model 320 is immediately available to the VAE 120 for assessing adapted video quality. The VAE 120 can specify operating conditions for different time compression ratios, bit-rates, and quantization parameters to determine the effect on adapted video quality. Accordingly, the VAE 120 can select frames 143 and transcoding parameters 142 for video shots that result in the optimal video quality using the PSNR-R spatio-temporal rate-distortion model 320. For example, referring back to FIG. 3, it should be noted that the VAE 120 performs intelligent video adaptation since it continues to select frames and transcoding parameters in video shot 1 until a lowest distortion is achieved. The VAE 120 then moves to video shot 2 to select frames and transcoding parameters in an adaptive manner that leads to optimal adapted video 152 quality. Returning back to FIG. 2, at step 235 the method 200 can end.

Referring to FIG. 7, the method step 210 for segmenting an input video is further described. At step 212, the video trace 111 can be generated from the input video 102, wherein the input video 102 comprises a sequence of frames 143 and the video trace 111. In such regard, the video trace 111 is generated directly from the input video 102. In another embodiment, the video trace 111 can be retrieved from side information associated with the input video 102. That is, the video trace 111 can be pre-computed with the input video 102 and distributed with the input video 102. In such regard, it is not necessary to generate the video trace 111 since it is provided with the input video 102.

At step 214, the input video can be segmented based on the video trace wherein the video shot compresses a set of frames having continuity. Referring to FIG. 3, in the preferred embodiment, the video shots 142 are derived from the video trace 111. The shot segmentation unit 140 segments the sequence of frames 143 in the input video 102 into adaptation units that will have a smooth coding, or rate-distortion, behavior upon transcoding. The shot segmentation unit 140 can employ various shot boundary detection methods for identifying abrupt transition regions in the input video 102 and segmenting the input video 102 into the video shots 142. One exemplarily shot boundary detection method employs the video trace 111 to identify video shot boundaries. In the preferred embodiment, the video trace 111 is generated via Principal Component Analysis (PCA) as will be explained ahead. One method approach to employing the video trace 111 for video shot segmentation is as follows. For a frame $f_k$ in a video sequence (See FIG. 3) with $x_k$ as a Principal Component Analysis (PCA) trace space representation one can evaluate $$d_k^I = \min_{j \in [1, K_{max}]} [\|x_k - \tilde{x}_{k-j}\|].$$

where $K_{max}$ is the maximum number of previous frames being considered. A type I shot boundary is detected at frame $f_k$, if $d_{kl}$ is greater than a certain threshold $d_{maxI}$. By considering more than one frames in the detection makes the shot detection more resilient to short spurious changes in the frame sequence characteristics. Examples of video shot 142 boundaries for the input video 102 sequence are shown in FIG. 8. Other embodiments for shot boundary detection are also herein contemplated.

Figure 9:
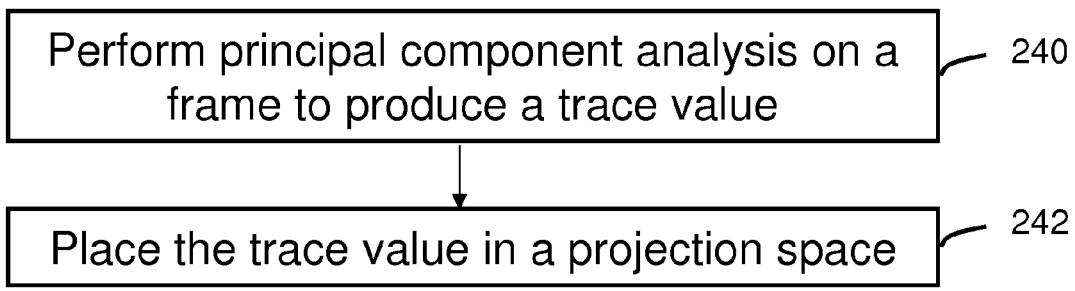
FIG. 9 is a method to generate a video trace in accordance with the embodiments of the invention.
Figure 10:
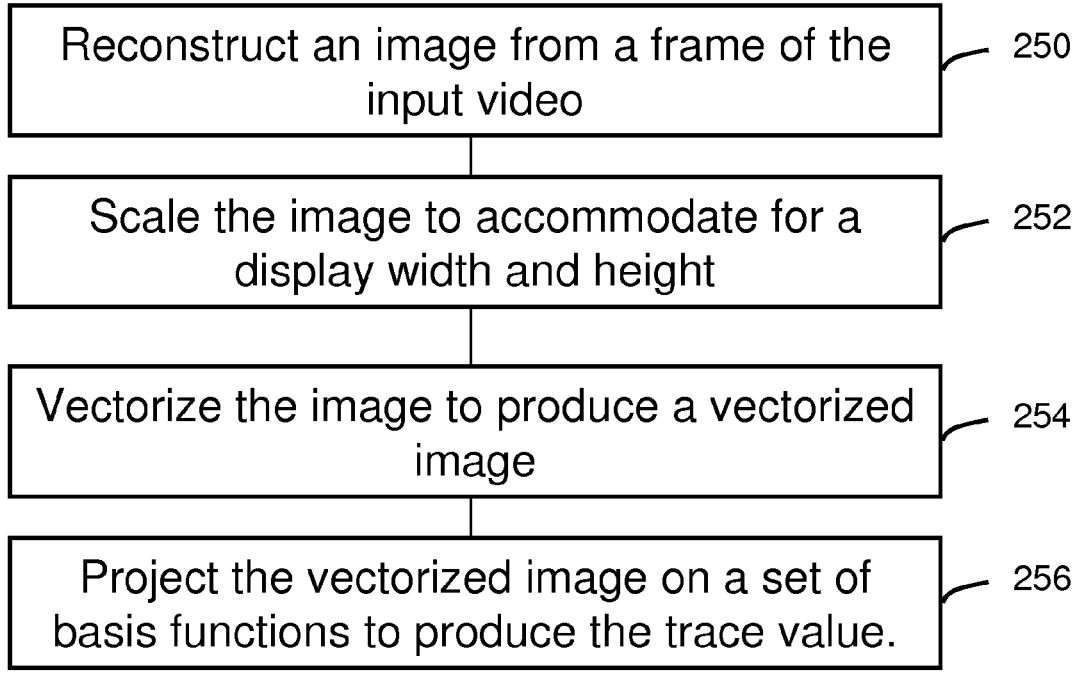
FIG. 10 is a method of principal component analysis (PCA) in accordance with the embodiments of the invention.
Figure 11:
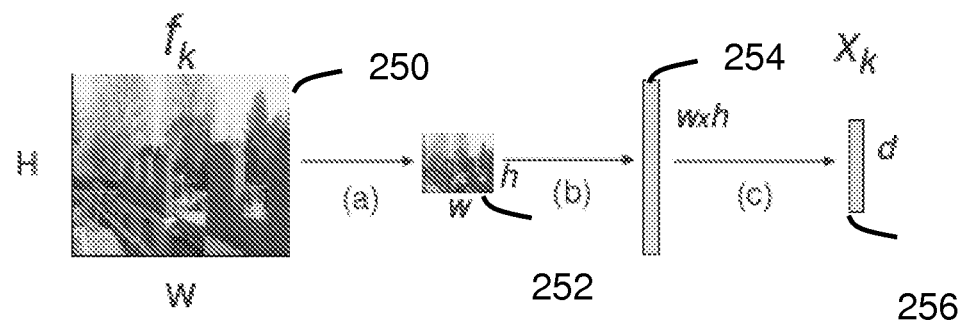
FIG. 11 is an illustration for vectorizing an image using PCA in accordance with the embodiments of the invention.

Referring to FIG. 9, the method step 212 for generating the video trace 111 is shown. At step 240, Principal Component Analysis (PCA) can be performed on a frame to produce a trace value. PCA is a method by which eigenvectors and eigenvalues of the input video 102 can be determined, wherein the eigenvectors are principal components and the eigenvalues are the variance of the eigenvectors. At step 242, the trace values can be placed in a projection space to create the video trace 111. The projection space has a dimension equal to the number of principal components (e.g. eigenvectors). FIG. 10, shows the method steps for performing Principal Component Analysis in accordance with one embodiment of the invention for creating the video trace 111. At step 250, an image can be reconstructed from a frame of the input video. For example, briefly referring to FIG. 11, a reconstructed image is shown. In practice, referring back to FIG. 2, the transcoder 150 can reconstruct the image from a frame 143 in a video shot 142. Returning back to FIG. 10, at step 252 the image can be scaled to accommodate for a display width and height. Briefly referring to FIG. 11, the image can be scaled accordingly. In practice, referring back to FIG. 1, the VAE 120 scales the image to account for a display width and height associated with the mobile device 160. Returning back to FIG. 10, at step 254, the image can be vectorized to produce a vectorized image. As seen in FIG. 11, vectorization can include converting a matrix of pixels in the image into a column vector. Returning back to FIG. 10, at step 256, the vectorized image can be projected on a set of basis functions (See FIG. 12) to produce the trace value. As the luminance component of the image contains much of the visual information, the preferred embodiment computes the PCA using only the luminance component. The projection of the vectorized image onto a basis function produces the scalar value, d, as shown in FIG. 11.

Figure 12:
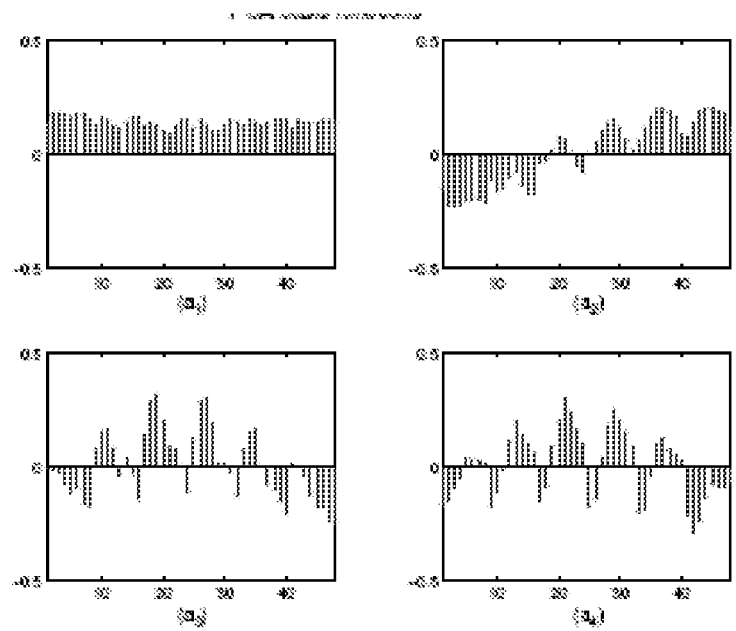
FIG. 12 is a set of PCA basis functions in accordance with the embodiments of the invention.

The method for generating a video trace is represented more precisely as follows. Let the input video sequence frames 143 be denoted $\{f_1, f_2, \ldots, f_n\}$ (See FIG. 3), each with a luminance component of size W×H pels. Let the desired scaled frame be of size w×h pels, and the desired PCA space is of dimensionality d. The video trace 111, $\{x_1, x_2, \ldots, x_n\}$, is then obtained by, $$x_k = A(S(f_k))$$

$$A = \operatorname*{argmax}_{A} \sum_k (x_k - \bar{x})^2$$

where S( ) is the luminance component scaling function that converts the W×H component into a vector in $R_{w \times h}$. The PCA transform matrix, A, is of dimensionality wh×d, and obtained from Eigen analysis of the covariance matrix of the scaled video luminance data. Exemplary PCA basis functions for w=8, h=6, and d=4 are shown FIG. 12. More specifically, FIG. 12 shows four basis functions. Each basis function can be multiplied with the vectorized image $X_k$ and summed together to produce a scalar trace value. A trace value is one point in the video trace 111. It should be noted that a projection onto four basis functions produces a trace value in a four dimensional space. Similarly, a projection onto three basis functions produces a trace value in a three dimensional space.

Figure 13:
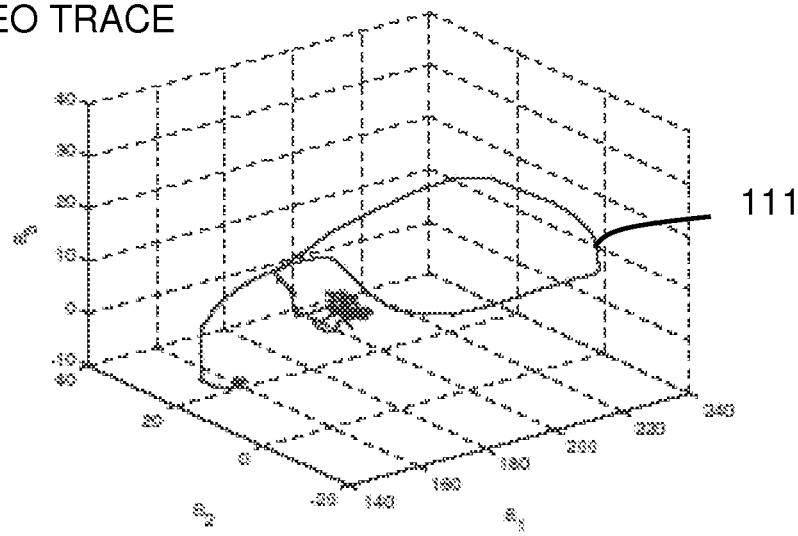
FIG. 13 is a video trace in accordance with the embodiments of the invention.

For purposes of illustration, the projection of an exemplary input video 102 onto the first 3 basis, $\{a_1, a_2, a_3\}$, is shown as the video trace 111 in the three dimensional space of FIG. 13. In practice, each vectorized image produces one trace value that is associated with the image. In such regard, a video trace 111 is created for the entire sequence of frames 143 (e.g. images) of the video shot 142. Each trace value along the video trace 111 corresponds to a spatial and temporal representation of the image that is associated with the trace value.

Figure 14:
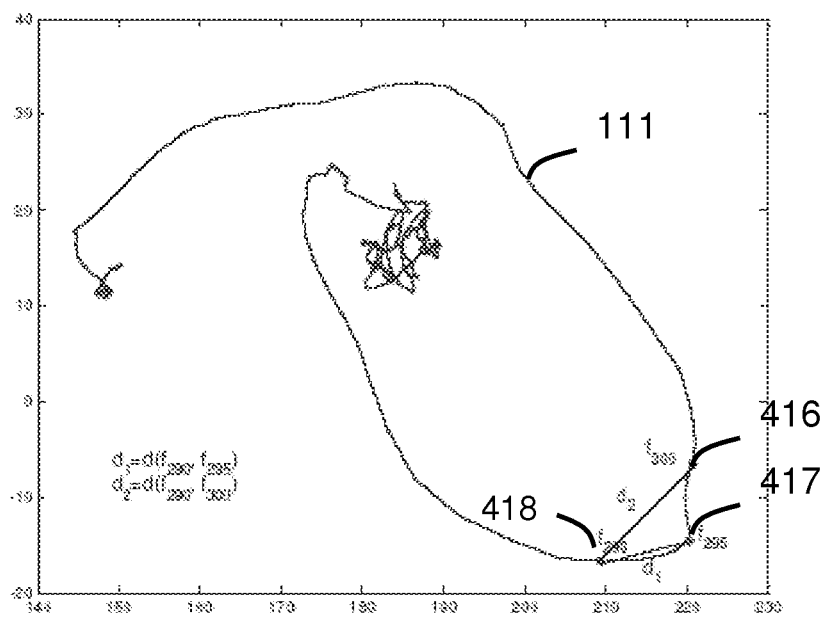
FIG. 14 is a projection of the video trace of FIG. 13 in accordance with the embodiments of the invention.

Recall, the video trace 111 is used to segment the input video 102 into video shots 142. The video trace 111 is a compact representation of the temporal and spatial characteristics of the input video sequence. Referring to FIG. 14 a top view slice 400 of the three dimensional video trace of FIG. 13 is shown. As a result of PCA, the distance between each trace value in the video trace 111 is associated with a temporal distortion of the images. In particular, the Euclidean distance between two points in the video trace 111 corresponds to a temporal distortion between the images associated with the trace values. For example, the distance between frames 290 (418) and 295 (417) is plotted as $d_1$, and distance between frames 290 (418) and 300 (416) is plotted as $d_2$. The trace extraction can be done either offline, and received as side information with the input video 102, or online, if the trace information is not available. In the online case, additional delay and buffering are required to generate the trace values.

Briefly returning back to the method 200 of FIG. 2, a more detailed description for method steps 220 and 230 are provided. In particular, at method step 220, the frames of the video shots are chosen to minimize a temporal distortion of the adapted video 152. For example, the VAE 120 derives the following transcoding parameters for each video shot 142:

output frame width, W, and height, H. s.t., W×H∈{CIF, QCIF, SQCIF, VGA, etc.} temporal compression level r=m/n, where n is the number of frames in the video shot, and m is the number of frames in the adapted video shot.

quantization parameters QI/QP to use for those frames selected for coding.

These parameters are referred to as operating points, X, within the VAE 120, i.e. X=[W, H, r, QI, QP]. The operating points, X, determine the video quality of the adapted video 152 due to transcoding 150. That is, the transcoder 150 will produce variations in video quality dependent on the operating points selected. A quality vector, Q, can be assigned to the quality of the adapted video which can be used during the adaptation session. More specifically, the quality vector, Q, can be used as a feedback measure to determine the optimal number of frames to select (e.g. subset of frames 144), which frames to select in the video shots, and the quantization parameters for producing optimal video quality based on operating points 130 such as bit-rate, R 316, quantization parameters, QP 314, and a time compression factor, r 312. The VAE 120 uses the quality vector, Q, to achieve the best visual quality possible under frame size, bit-rate, and viewing time constraints. The VAE 120 provides flexibility in adapting to view time, bit-rate, and frame size constraints.

The quality vector, Q, can be defined as, Q=[W, H, $D_{mse}$, $D_{avg}$, $D_{max}$] where W and H are the frame size, $D_{mse}$ is the average spatial MSE distortion for the adaptation unit, and $D_{avg}$ and $D_{max}$ define the temporal quality of the video shot. $D_{avg}$ and $D_{max}$, are defined as, $$D_{avg} = (1/n) * \sum_{k=1}^{n} d(f_k, f_k');$$

-continued $$D_{max} = \max_k d(f_k, f_k');$$

where $f_k'$ is the zero-th hold reconstructed at time k. The distance function $d(f_j, f_k)$ is the temporal distortion between two frames $f_j$ and $f_k$ in the video shot, which is the Euclidean distance in the video trace 111 space as previously discussed in FIGS. 11-14.

For each video shot 142 and operating point, X, there is an associated rate, R(X) 316, and quality, Q(X). The adaptation thus becomes the process of selecting an operating point, X 1 30, that satisfies the user preferences, and meets the system constraints while proving the best possible quality, Q(X). In determining the operating point, X, the frames size Wand Hare typically determined at the start of the adaptation session based upon the receiving terminal's display size or user preference. The size also typically stays constant throughout the adaptation session. The other parameters, r, QI, and QP can be adjusted and optimized throughout the session. Once Wand H have been selected, the resulting operating parameters of X are then determined based upon the constraints on the viewing time/temporal compression and bit rate. Both of these constraints need not be present jointly. If viewing time/temporal compression constraint is present, i.e., people prefer to adapt video to a shorter version, then for the corresponding temporal compression level r=m/n 312, the video frames belong to the adapted video shot and the resulting temporal quality metrics $D_{avg}$ and $D_{max}$, are determined through the following algorithm.

Selection of Frames to Transcode

In the foregoing, a more detailed description of method step 220 of FIG. 2 for selecting a subset of frames in a video shot is provided. Briefly, referring back to FIG. 3, each video shot 142 consists of a number of frames 143 that may be selected. The end result is a subset of frames 144 in the video shot that produce an optimal video quality. In practice, the VAE 120 selects the subset of frames 144 from a video shot 142 to minimize distortion as measured by PSNR 318 under constraints of bit-rate, viewing time, and quantization parameters.

Referring to FIG. 15, a portion of pseudo code is shown for selecting the frames to transcode. Embodiments of the invention are not limited to the steps presented in the pseudo code. Briefly, the method get_summary 510 selects the subset of frames 144 from the frames 143 in the video shot 142 (See FIG. 3). Let S be the set of frames 143 belonging to the video shot 142 and r 312 be the input temporal compression ratio. At 512, the VAE 120 can identify distortion thresholds from the video trace 111 given operating points 130 and system constraints. The VAE 120 performs a recursive search on the distortions provided in the video trace 111 to reach a compromise between good quality playback and the configuration parameter for the subset of frames selected. Recall, frame distortions can be evaluated by measuring a Euclidean distance in the video trace 111. The VAE 120 searches for frames in the set S having distortions below thresholds $T_{max}$ and $T_{min}$ to reach the compression level r=m/n with small temporal distortion $D_{max}$ and $D_{avg}$. The method Compute_summary 518 identifies which frames in the video shot are below the distortion thresholds and which can be considered candidates for selection in the subset 144 of frames The thresholds can be adapted for finding selecting the subset of frames. In the current embodiment, $T_{max}$ is determined thru a heuristic weighted combination ($W_1$ and $W_2$), of the sum of differential frame distortion, $d(f_k, f_{k-1})$, and the maximum differential frame distortion, while $T_{min}$ is determined thru the search on the tightest choice of S (as implemented thru the margin e on difference between searching upper and lower bounds on $T_{min}$, $T_1$ and $T_2$) that gives the minimum distortion with the subset of frames that also meets constraint on r 312. At step 520, the frames that meet the distortion threshold are selected for inclusion in the subset 143. The pseudo code 510 is a heuristic search method that is computationally efficient and provides good quality-resource tradeoff.

Selection of Transcoding Parameters for Selected Fames

In the foregoing, a more detailed description of method step 220 of FIG. 2 is presented. In particular, a use of the spatio-temporal rate-distortion models in selecting transcoding parameters for the selected frames is provided. Recall, the video adaptation system 100 of FIG. 1 selects frames in the video shots that provide optimal adapted video quality. In order to do so, the video adaptation system 100 must take into account the quantization parameters to meet the desired bitrate adaptation. For example, the transcoder 150 operates at a certain bit-rate and will produce variations in video quality depending on the quantization parameters chosen. For bit rate adaptation, the transcoder 150 needs to make decisions on QP and QI to meet desired total rate constraint. In the preferred embodiment, it is assumed that QI=QP. The total rate needed to encode the selected frames is a function of QP 314 and r 312, and described by the R(QP, r) spatio-temporal distortion model 310. Furthermore, the average spatial quality of the adapted video shot in Peak Signal-to-Noise Ratio (PSNR) is a monotonic function of QP 314, and to a lesser degree, of r 312 as well, PSNR(QP, r).

Figure 16:
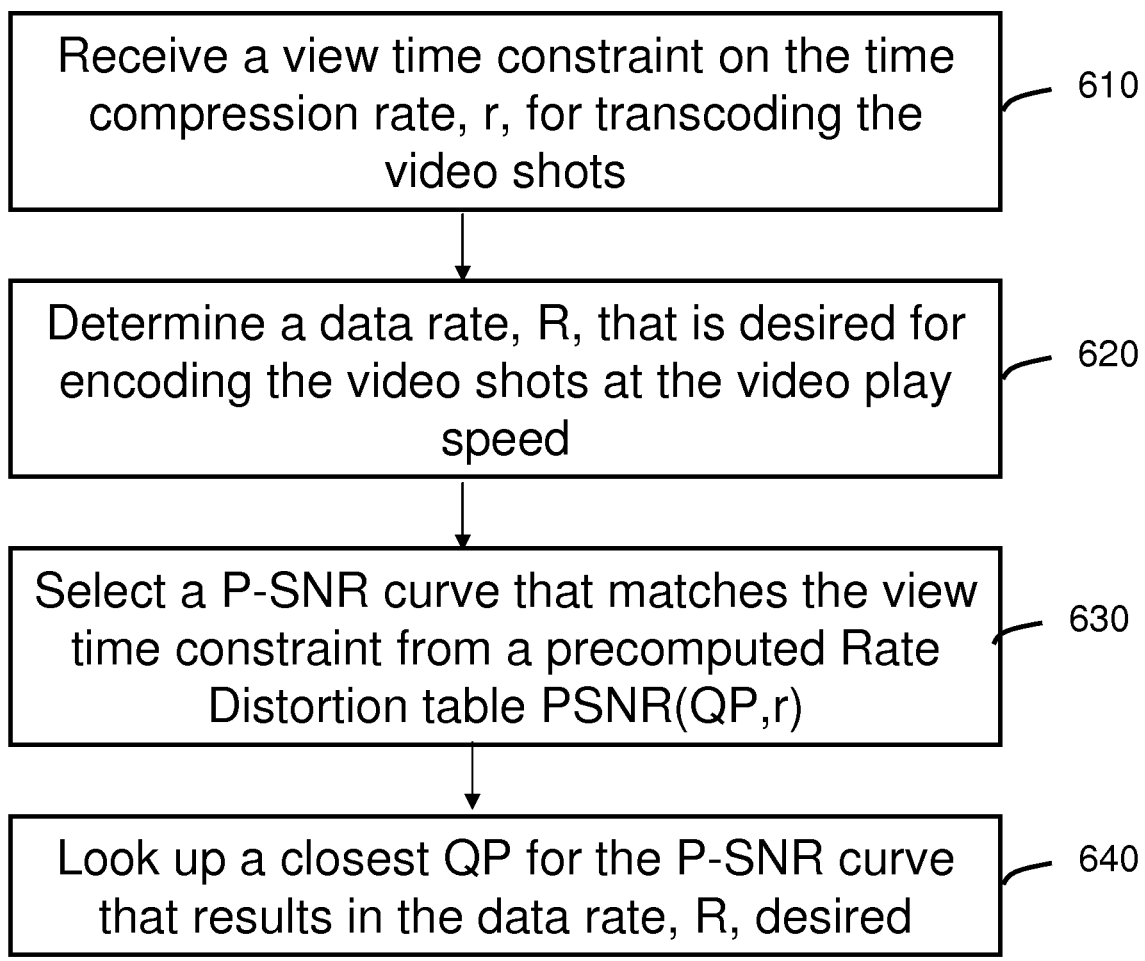
FIG. 16 is a method to select coding parameters in accordance with the embodiments of the invention.

Referring to FIG. 16, a method 600 for selecting the transcoding parameters is shown. The method 600 can be practiced with more or less that than the number of steps shown. To describe the method 600, reference will be made to FIGS. 1, 3, and 6. Moreover, the method 600 is not limited to the order in which the steps are listed in the method 600. In addition, the method 600 can contain a greater or a fewer number of steps than those shown in FIG. 16.

At step 602, a view time constraint for the time compression rate, r, for transcoding the video shots can be received. The view time constraint identifies the adapted video play speed. For example, referring to FIG. 1, the VAE 120 can receive the view time constraint in the adaptation request 126. Returning back to FIG. 16, at step 620, the VAE 120 can determine a data rate, R 316, that is desired for encoding the video shots 142 at the video play speed. At step 630, the VAE can select a P-SNR curve that matches the view time constraint from a pre-computed Rate Distortion table PSNR(QP, r). For example, referring to FIG. 6, the VAE 102 can select the curve that matches the view time constraint specified by r 312, and the bit-rate 316, for the desired video quality. At step 640, the VAE 120 can look up a closest QP for the P-SNR curve that results in the data rate, R, desired.

For example, if viewing time constraint is present, the transcoder 150 selects the R-PSNR curve that matches the view time constraint, and then look up the closest QP for that curve that result in the desired bit rate. For example, in the with reference to FIG. 5, if view time compression rate of r=45/400 and rate $R_{max}$=30 kpbs is given, then the closest QP is 33, that will results in an PSNR of 32.5 dB. That is, the quantization parameters QP 314 can be determined from the PSNR-R spatio-temporal distortion model 310 based on the PSNR curve 316 selected. Notably, the PSNR-R spatio-temporal distortion model 310 identifies the transcoding parameters need to achieve an optimal video quality. Recall, for each video shot, and operating point, X, there is an associated rate, R(X), and quality, Q(X). The adaptation of the VAE 120 thus becomes the process of selecting an operating point, X, that satisfies the user preferences, and meets the system constraints while proving the best possible quality, Q(X).

When view time compression preference is not explicitly expressed, there will be ambiguity in selecting operating points QP and r, which may result in different spatial and temporal quality levels. This is especially true at lower bit rate, where bits need to be spent wisely to achieve good subjective visual quality after adaptation. To resolve this, the adaptation engine needs to model the trade offs between the spatial and temporal distortions. Since in the preferred embodiment temporal distortion metrics $D_{max}$ and $D_{min}$ have dependences, the tradeoff between the average temporal distortion $D_{min}$ and spatial quality PSNR need to be modeled, which is expressed as an utility function maximization problem, $$[QP^*, r^*] = \underset{QP,r}{\mathrm{argmax}}\, U(PSNR, D_{min}),\ \text{s.t.}\ R(QP, r) \le R_{max}$$
$$= \underset{QP,r}{\mathrm{argmax}}\, U(PSNR(QP, r) D_{min}(r)),\ \text{s.t.}\ R(QP, r) \le R_{max}$$

The optimal solution may be found by a direct utility search, though more sophisticated numerical alternative also exists.

Based on the rate-distortion operating points stored for the video shot, {QP, r ([0.0, 1.0]), R (kbps), PSNR(dB), $D_{min}$, $D_{max}$}, and a given utility function U(PSNR, $D_{min}$), the adaptation engine can first reconstruct PSNR-R curves at pre-determined view time compression levels r={0.1, 0.2, 0.3, 0.4, 0.5}, as similar to FIG. 5b. Then a low-bit rate adaptation utility table is produced by evaluating utility at QP×r grid at r={0.1, 0.2, 0.3, 0.4, 0.5}. A quick sort of operating points {QP, r} by associated rate R(QP, r), and then a fast bi-section search on the utility value U(QP, r) will locate the optimal adaptation point {QP*, r*} for the low bit rate.

Figure 17:
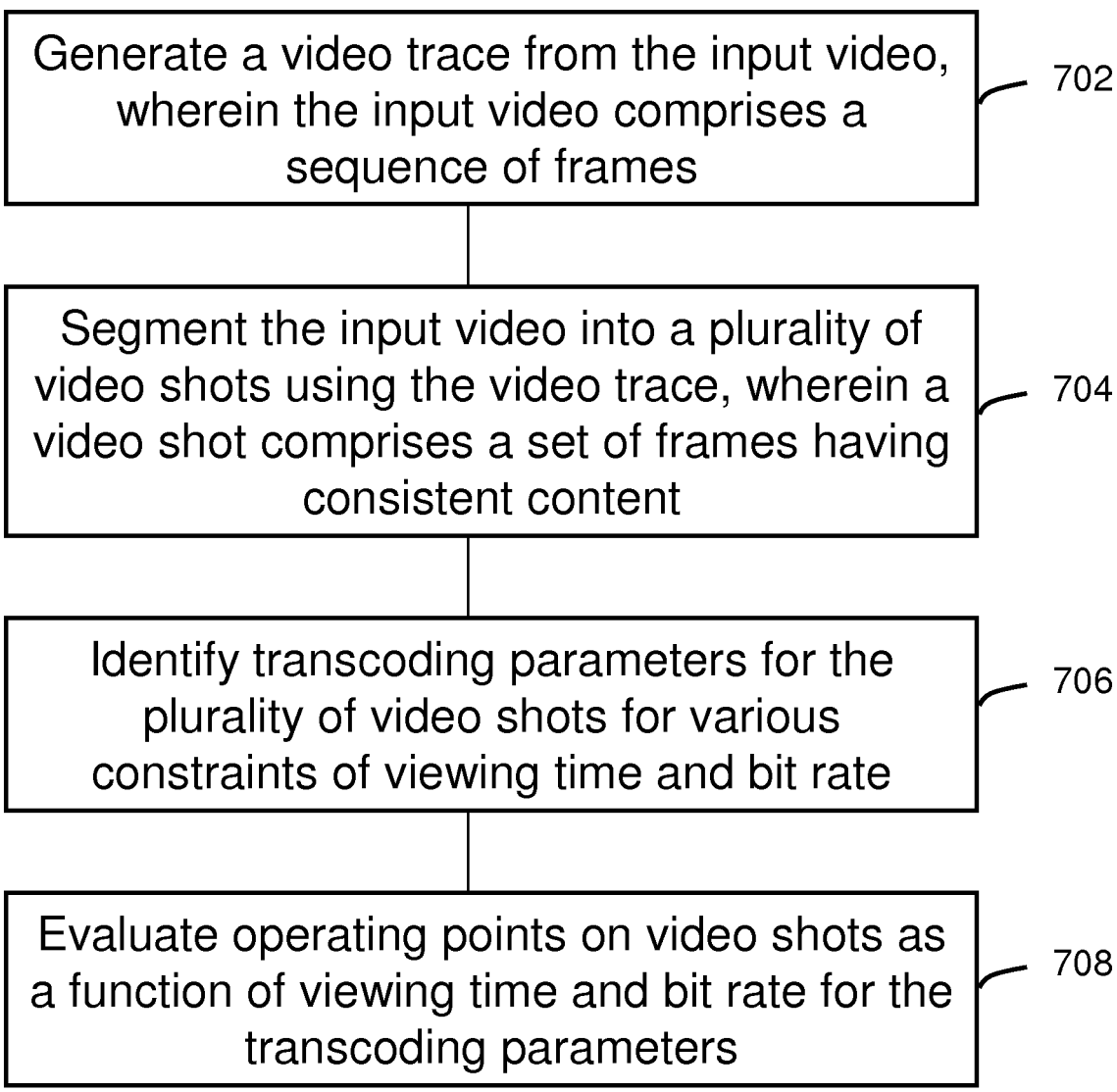
FIG. 17 is a method for building a PSNR-R spatio-temporal rate model in accordance with the embodiments of the invention.

As described, the preferred embodiment takes a model based approach in QI/QP decision. That is, the PSNR-R spatio-temporal distortion is employed to determine the tradeoff between coding efficiency and adapted video quality. Referring to FIG. 17, a method 700 for building the PSNR-R spatio-temporal rate-distortion model 320 is shown. The method 700 can be practiced with more or less that than the number of steps shown. Moreover, the method 700 is not limited to the order in which the steps are listed in the method 700. In addition, the method 700 can contain a greater or a fewer number of steps than those shown in FIG. 17.

At step 702, a video trace can be generated from the input video, wherein the input video comprises a sequence of frames. At step 704, the input video can be segmented into a plurality of video shots using the video trace, wherein a video shot comprises a set of frames having consistent content. At step 706, transcoding parameters can be identified for the plurality of video shots for various constraints of viewing time and bit rate. At step 708, operating points on video shots can be evaluated as a function of viewing time and bit rate for the transcoding parameters. The PSNR-R spatio-temporal distortion model 320 can be stored as a table as side information 112 to the input video 102. The VAE 120 can access the PSNR-R spatio-temporal distortion model 310 during video adaptation. The model information can be stored as a table of control points of form:

{QP, r ([0.0, 1.0]), R (kbps), PSNR (dB), $D_{min}$, $D_{max}$}

Once this R(QP, r)-PSNR(QP, r) model parameterized from the stored control points is known, the VAE can perform video adaptation in accordance with method 600 of FIG. 16.

To build a model of R(QP, r) and PSNR(QP, r), only a few operating points [QP, r] on a video shot 142 are needed. The operating points 130 can be interpolated using, for example, Splines, to model the rest of operating points. Fast algorithms for R-D modeling like p-domain modeling are also herein contemplated.

In summary, a system 100 and method 200 has been provided for intelligent video adaptation. In particular, a system for the selection of transcoding parameters has been provided, a method for segmenting video shots using a video trace within a transcoding network has been provided, a compact set of side information that includes the video trace 111 and spatio-temporal rate-distortion model 320 in a look-up table approach to select appropriate transcoding parameters based on usage history has been provided, and adaptive modeling of the transcoding parameters for achieving optimal video quality has been provided.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for efficient video adaptation of an input video with a sequence of frames, the method comprising:
generating a video trace from the input video by performing principal component analysis on each frame of the sequence of frames to determine eigenvectors for each frame, wherein the video trace is a compact representation for temporal and spatial distortions for the sequence of frames;
segmenting the input video into a plurality of video shots using the video trace, wherein each video shot has a consistent rate-distortion coding consistency;
selecting, using the video trace, a subset of frames for the video shots that minimizes spatial-temporal distortions of adapted video; and
selecting transcoding parameters for the subset of frames to produce an optimal video quality of the adapted video under constraints of frame rate, bit rate, frame quality, and viewing time constraint.

2. The method of claim 1, wherein the step of selecting transcoding parameters includes:
querying spatio-temporal distortion models for quantization parameters at various operating points; and
adapting the transcoding parameters to network characteristics, device capacity, and user preference in accordance with the spatio-temporal distortion models,
wherein the adapting is a process of selecting an operating point that satisfies the user preferences, and meets system constraints while providing optimal video quality in the adapted video.

3. The method of claim 2, wherein the step of selecting transcoding parameters further comprises looking up quantization parameters, QP, in a spatio-temporal model to achieve optimal video quality, wherein the spatio-temporal model is a function of time compression rate, r and a bit-rate, R.

4. The method of claim 2, further comprising retrieving a pre-computed video trace and pre-computed spatio-temporal model from side information associated with the input video.

5. The method of claim 1, further comprising building a spatio-temporal model from the input video.

6. The method of claim 5, wherein the step of generating a video trace comprises:
performing principal component analysis on a frame to produce a trace value; and
placing the trace value in a projection space,
wherein a distance between two trace values in the projection space is a temporal distortion between two frames corresponding to the two trace values.

7. The method of claim 1, wherein the step of performing principal component analysis, comprises:
reconstructing an image from a frame of the input video;
scaling the image to accommodate for a display width and height;
vectorizing the image to produce a vectorized image; and
projecting the vectorized image on a set of basis functions.

8. The method of claim 1, wherein the step of selecting transcoding parameters further comprises:
receiving a view time constraint on the time compression rate, r, for transcoding the video shots, wherein the video time constraint establishes a video play back duration;
determining a data rate, R, that is desired for encoding the video shots at the video play back duration;
selecting a P-SNR curve that matches the view time constraint from a pre-computed Rate Distortion table PSNR (QP,r); and
looking up a closest QP for the P-SNR curve that results in the data rate, R, desired.

9. The method of claim 1, wherein the step of selecting the transcoding parameters takes into account a viewing time for setting the time compression factor, r.

10. A method for generating side information to an input video with a sequence of frames, the method comprising:
generating a video trace from the input video by performing principal component analysis on each frame of the sequence of frames to determine eigenvectors for each frame, wherein the video trace is a compact representation for temporal and spatial distortions for the sequence of frames and the video trace is used to generate spatio-temporal rate distortion models;
segmenting the input video into a plurality of video shots using the video trace and the spatio-temporal rate distortion models, wherein each video shot has a consistent rate-distortion coding consistency;
identifying transcoding parameters for the plurality of video shots for various constraints of viewing time and bit rate; and
evaluating operating points on video shots as a function of viewing time and bit rate for the transcoding parameters.

11. The method of claim 10, further comprising:
storing the spatio-temporal rate-distortion models as side information with the input video; and storing the video trace as side information with the input video.

12. The method of claim 10, wherein the step of identifying transcoding parameters for the plurality of video shots includes evaluating several operating points on plurality of video shots and interpolating between the operating points for identifying quantization parameters.

13. The method of claim 10, wherein the step of generating a video trace comprises:
    performing principal component analysis on frames of a video shot to produce a trace value; and
    placing the trace value in a projection space of the video trace, wherein a distance between two trace values in the projection space is a temporal distortion between two frames corresponding to the two trace values.

14. A system for transcoding an input video comprising:
    a compressed domain processor for
        receiving an input video having a sequence of frames and
        generating a video trace from the input video by performing principal component analysis on each frame of a sequence of frames to determine eigenvectors for each frame, wherein the video trace is a compact representation for temporal and spatial distortions for the sequence of frames in the input video; and
    a video adaptation engine (VAE) operatively coupled to the compressed domain processor for using the video trace to
        temporally segment an input video into video shots using the video trace, wherein each video shot has a consistent rate-distortion coding consistency,
        select which frames to transcode in the video shots using the video trace, and
        generate transcoding parameters for the frames that provide optimal adapted video quality in accordance with an adaptation request and operating points of a transcoder.

15. The system of claim 14, further comprising:
    a shot segmentation unit that receives the video trace from the compressed domain processor and segments the input video into video shots having rate-distortion coding consistency across frames; and
    a transcoder that receives the video shots from the shot segmentation unit and receives transcoding parameters from the VAE for adapting the input video to produce adapted video in accordance with constraints of bit rate, frame rate, and distortion.

16. The system of claim 15, wherein the VAE generates the transcoding parameters from the video trace in view of the adaptation request by
    selecting frames in the video shots that minimize a temporal distortion of the adapted video using the video trace;
    querying spatio-temporal distortion models for different operating points; and
    repeating the steps of selecting frames and querying the spatio-temporal distortion models at the video shot level for identifying an operating point that provides optimal adapted video quality given the adaptation request.

17. The system of claim 14, wherein the VAE further performs the steps of:
    evaluating various operating points for adapted video quality using the spatio-temporal rate-distortion models; and
    selecting operating points and transcoding parameters for the plurality of video shots that satisfy a user preference and meet system constraints while achieving an optimal quality of adapted video.

18. The system of claim 14, wherein the VAE retrieves the video trace and spatio-temporal distortion models from side information associated with the input video.

19. The system of claim 14, wherein the VAE builds spatio-temporal distortion models from the video trace for different operating points during video adaptation.

20. The system of claim 14, wherein the VAE decides what frames in a video shot are selected for transcoding and decides the quantization parameters for the frames to achieve an optimal adapted video quality based on the spatio-temporal distortion models that characterize how the quantization parameters affect the output video quality.

21. The system of claim 14, wherein, when a time compression factor is not provided, the VAE solves a utility function maximization problem by:
    reconstructing spatio-temporal rate distortion models at pre-determined view time compression levels;
    evaluating a utility at operating points in the spatio-temporal rate distortion models;
    sorting operating points by an associated rate; and
    performing a bi-section search on the utility to locate an optimal adaptation point.

* * * * *

UNITED STATES PATENT AND TRADEMARK OFFICE
CERTIFICATE OF CORRECTION

| | | |
|---|---|---|
| PATENT NO. | : 8,761,248 B2 | Page 1 of 1 |
| APPLICATION NO. | : 11/744100 | |
| DATED | : June 24, 2014 | |
| INVENTOR(S) | : Li et al. | |

It is certified that error appears in the above-identified patent and that said Letters Patent is hereby corrected as shown below:

On title page 2, item [56], in column 1, line 2, delete "Multimeida" and insert -- Multimedia --, therefor.

Signed and Sealed this
Second Day of September, 2014

Michelle K. Lee
*Deputy Director of the United States Patent and Trademark Office*